(12) United States Patent
Di Anna

(10) Patent No.: US 6,659,378 B2
(45) Date of Patent: Dec. 9, 2003

(54) FIELD SHREDDER FOR PRUNED BRANCHES

(76) Inventor: Guiseppe Di Anna, 5912 Garst Rd., Modesto, CA (US) 95357

( * ) Notice: Subject to any disclaimer, the term of this patent is extended or adjusted under 35 U.S.C. 154(b) by 0 days.

(21) Appl. No.: 10/099,344

(22) Filed: Mar. 13, 2002

(65) Prior Publication Data

US 2003/0183708 A1 Oct. 2, 2003

(51) Int. Cl.[7] .............................................. B02C 21/02
(52) U.S. Cl. ..................................... 241/73; 241/101.77
(58) Field of Search ............................... 56/13.6, 14.3, 56/14.7, 17.5; 241/101.77, 101.763, 73, 277, 189.1, 242, 154

(56) References Cited

U.S. PATENT DOCUMENTS

| | | | | |
|---|---|---|---|---|
| 4,232,719 A | * | 11/1980 | Payton | 144/34.1 |
| 4,506,839 A | * | 3/1985 | Black | 241/101.763 |
| 4,690,224 A | | 9/1987 | Shwez | |
| 4,938,425 A | * | 7/1990 | Williams et al. | 241/101.77 |
| 5,354,003 A | | 10/1994 | Stokes | |
| 5,901,541 A | | 5/1999 | Lindquist | |
| 6,185,919 B1 | * | 2/2001 | Borchard | 56/14.5 |
| 6,425,232 B1 | * | 7/2002 | Desnijder et al. | 56/16.4 B |

* cited by examiner

Primary Examiner—Mark Rosenbaum
(74) Attorney, Agent, or Firm—R. Michael West

(57) ABSTRACT

A mobile field shredder adapted to move continuously through an orchard, pick up pruned branches from the ground, and shred the branches into sawdust and small shredded pieces. The front end of the shredder includes a pair of counter-rotating feeder rollers for picking up the branches. A shredding chamber receives the branches from the feeder rollers. First and second shredder rollers within the shredding chamber, include plural knife blocks on their respective outer peripheries. The shredder rollers are driven in tandem, in the same direction. A chamber screen is provided at the after end of the shredding chamber, in close proximity to the second shredder roller. The shredder rollers reduce the size of material so it is can pass through perforations in the screen. The consistency and size of the shredded material is such that it rapidly decomposes in the field and enriches the soil in the orchard.

28 Claims, 5 Drawing Sheets

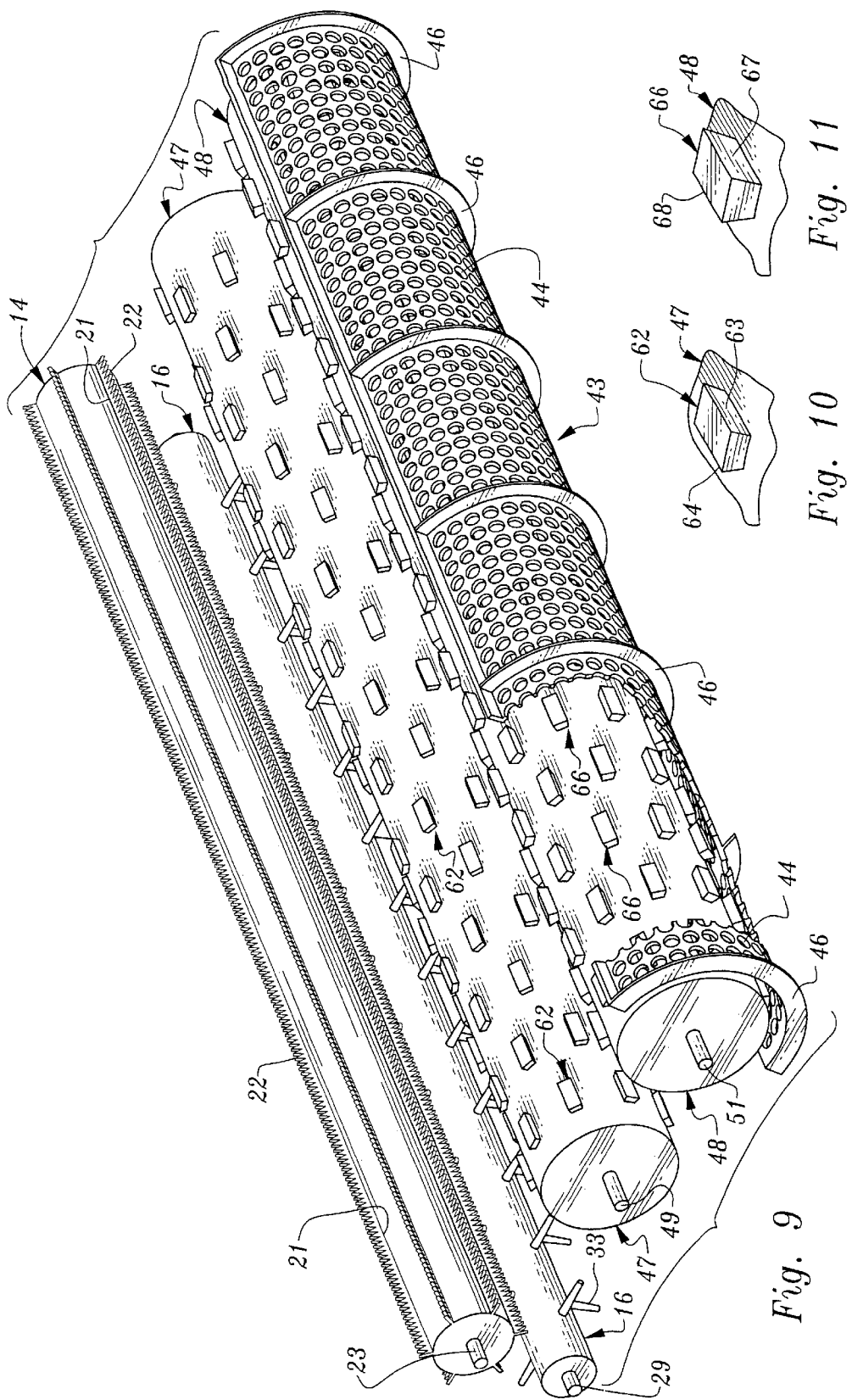

FIELD SHREDDER FOR PRUNED BRANCHES

BACKGROUND OF THE INVENTION

1. Field of the Invention

The invention relates generally to devices for shredding pruned plant material into particle size. More specifically, the invention pertains to a self propelled field shredder, adapted to pass through an orchard, pick up pruned branches from the ground, and shred the branches into sawdust and small shredded particles. The consistency and size of the shredded material is such that it rapidly decomposes in the field and enriches the soil in the orchard.

2. Description of the Prior Art

Orchard trees, such as almonds, pistachios, and walnuts, are typically pruned at the end of each harvest season. This pruning is undertaken to shape and size the trees, as well as to improve their production. The pruned material may range in size from small twigs to branches up to four inches in diameter. As pruning crews move through the orchard, the cut twigs and branches are simply dropped into piles between rows of the trees. Later, individual piles are pushed by machinery and consolidated into larger piles at the end of the rows. Then, the large piles are burned under controlled conditions, to eliminate all trace of the cuttings.

This process is labor consuming, because the material has to be moved considerable distances from where it was cut. In addition, agricultural burning of cuttings and like material, has fallen into disfavor, owing to the air pollution it necessarily produces. It appears likely that new Federal and State air pollution standards will severely limit or even eliminate large scale agricultural burning of this sort, in the near future.

In lieu of burning branch cuttings, chipping or shredding machines have been used in some applications either to cut up or to pulverize pruned material into relatively small pieces.

A conventional chipper uses knives mounted on a rotating flywheel or a drum. The material is held fast by a stationary shear bar or anvil as the knives pass close by. Chippers may also use infeed rollers to pull material into the machine and force it against the knives and anvil. The small chips produced by the cutting action of the knife and anvil arrangement are discharged through a chute.

When chippers are used to process tree cuttings, they are mounted on a truck body or on a trailer frame so they can be moved into a position close to the pruning operation. These mobile chippers are used primarily by utility crews for power or telephone service. Workers manually feed the chipper by pushing the branches into a rear positioned hopper. A rotating element, such as a drum or a disc having sharp blades on a cutting surface, aggressively draws branches into the chipper. The processed material may be stored in a bin mounted on the truck, or it may be discharged into a pile on the ground.

Shredders, by way of contrast, usually employ a rotatable element in conjunction with a screen. The rotatable element hammers, flails, or grinds the material into small pieces. When the pieces are small enough, they pass through perforations in the screen and are discharged. The most common shredder design uses a series of metal strips mounted on a rotating shaft. This type of shredder, known as a "Hammer Mill", forces the incoming material against a curved, perforated plate until it is broken up and shredded sufficiently to pass through the perforations.

The chipped, slivered, or shredded material may be used for ground cover or compost. However, the size and consistency of the material discharged by conventional chippers and shredders is such that it will not decompose quickly, and it cannot be added directly to soil to form a homogeneous mixture. This has particular consequences in almond orchards, where any foreign material left on the orchard floor is collected with the nuts during the mechanical harvest of the crop. At the hulling facility, the woody chips and shreds are difficult to separate from the almond hulls. Since almond hulls are sold to dairies as a feed supplement, excessive amounts of fiber, such as that provided by the woody material, reduce the food and economic value of the supplement. Moreover, to the extent that the chips or shreds can be separated from the hulls at the hulling facility, they pose an expensive storage and disposal problem.

While some chipping and shredding machines are designed to be operated in remote field locations, they cannot pick up branches from the ground and feed them into the chipper. Nor are such devices designed to process material while passing through a field. Conventional mobile chippers and shredders are simply parked for on-site operation, and then after finishing, moved on to a new location. No continuous field processing of material spread over a large area is possible.

Consequently, the need exists for a mobile device, adapted to pass through an orchard or field, and while in motion, continuously shred pruned material arranged in rows or piles.

The need also exists for a mobile field shredder which can shred branches into particles having a size and consistency whereby they can be deposited directly onto the ground, for rapid decomposition and soil enrichment.

The need further exists for a mobile field shredder which can produce shredded particles of a selected size and consistency.

The need also exists for a field shredder which can pick up variably-sized cuttings from the ground, and process them continuously without need for adjustment or interruption.

Lastly, the need exists for a detachable field shredder which can be front mounted on and coupled to a transport vehicle, providing both mobility and operational power for the shredder.

SUMMARY OF THE INVENTION

The field shredder of the present invention is properly characterized as a shredder, yet has some of the characteristics of a chipper.

The shredder of the present invention is constructed on a mobile shredder frame. The shredder frame is preferably detachably coupled to the front end of a tractor, or other transport vehicle. In that manner, the tractor may be used for other purposes throughout the growing year and the shredder may be stored until needed, or transported to another location for use with a different tractor.

Rotary feeder means is mounted on the front end of the shredder frame for picking up the pruned branches from the ground. The feeder means includes an upper feeder roller and a counter-rotating lower feeder roller. The feeder rollers are elongated, have parallel axes of rotation, and are mounted transversely with respect to the direction of travel of the shredder frame. In this manner, the central portions of the rollers are adapted to engage a row of stacked, pruned branches as the mobile frame is moved through an orchard, a vineyard, or other agricultural setting where cuttings are so row-arranged.

The upper feeder roller has plurality of circumferentially-spaced gripping plates. The plates extend longitudinally along the full length of the roller, and project in perpendicular fashion from its outer periphery. The plates are provided with an outer edge, having teeth or serrations for engaging the branches. The upper feeder roller is mounted on a pair of hydraulically damped sub-frames, pivotally mounted to the shredder frame. In response to variably-sized incoming branches, the upper feeder roller and the sub-frames rotate upwardly or downwardly to accommodate larger or smaller branches.

The lower feeder roller includes a plurality of radially extending tines for mechanically engaging and lifting the branches from the ground. A guide plate, including plural slots to accommodate rotational passage of the tines therethrough, is located above and slightly rearwardly from the lower feed roller. Branches lifted by the tines are engaged by the gripping plates of the upper roller, and are fed rearwardly, between the gripping plates of the upper roller and the guide plate.

A shredding chamber, mounted in the central and rear portions of the shredder frame, has a front inlet adjacent the output of the feeder means. The shredding chamber is defined by lateral end plates spanned by upper and lower shrouds. The chamber also includes an acuate, rear-positioned chamber screen, which provides an outlet for the shredded branch particles.

Housed within the shredding chamber are a first shredder roller and a second shredder roller. The shredder rollers have longitudinal axes of rotation parallel to the upper and lower feeder rollers. The first and second rollers are mounted for rotation on roller drive shafts, passing through both end s of the shredding chamber. Shredder roller pulleys are provided on the end extremities of these drive shafts.

A gear box is mounted in the central region of the shredder frame, above the shredding chamber. The gear box has an input drive shaft, and a pair of output drive shafts. Rotational power may be provided to the input drive shaft by an engine. This engine may be mounted either on the shredder, or on an auxiliary vehicle which transports the shredder. The output drive shafts extend laterally from either side of the gear box, past both end plates of the shredding chamber. A drive pulley is located on the outer end extremity of each drive shafts. A drive belt interconnects the drive pulley with the roller pulleys for the shredder rollers. The shredder rollers are thereby driven in tandem, in such a manner that their upper portions rotate rearwardly, and their lower portions rotate forwardly.

The first roller is provided with a plurality of knife blocks, strategically located in semi-helical rows on the outer periphery of the roller. The second roller is similarly equipped with knife blocks, but the height of these blocks is somewhat greater than the height of the knife blocks on the first roller. Each of the knife blocks has a sharp leading edge, which is arranged in spaced relation from the upper and lower shrouds and the arcuate chamber screen. These knife blocks both cut and shred the incoming branches, as they pass through the shredding chamber, first rearwardly from the first roller to the second roller, and then forwardly from the second roller to the first roller.

The residence time of material within the shredding chamber determines the size and consistency of the discharged particles. If the perforations within the chamber screen are enlarged in size, the residence time will be reduced and the particle size increased. If the perforations within the chamber screen are reduced in size, the residence time will be increased and the particle size decreased.

BRIEF DESCRIPTION OF THE DRAWINGS

FIG. 9 is a perspective view of the showing the physical characteristics of the major components of the shredder, including the feeder rollers, the shredder rollers, and the chamber screen;

FIG. 10 is an inset detail of a typical knife block affixed to the periphery of the first shredder roller; and, FIG. 11 is an inset detail of a typical knife block affixed to the periphery of the second shredder roller.

DETAILED DESCRIPTION OF THE PREFERRED EMBODIMENT

Figure 1:
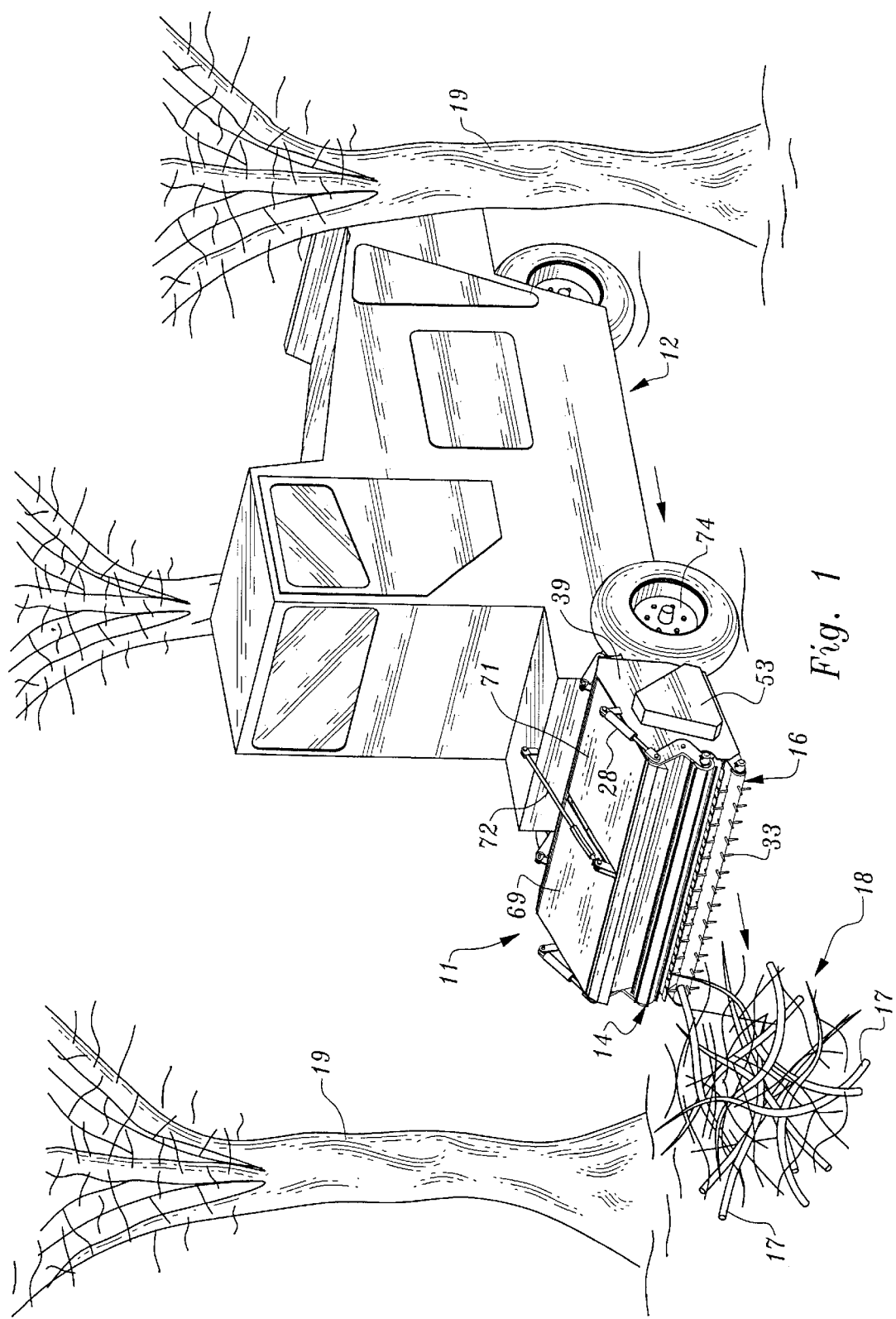
FIG. 1 is a perspective view of the field shredder of the present invention mounted upon the forward end of a tractor, the apparatus shown progressing through an orchard and about to encounter a pile of branch prunings.

Turning now to FIG. 1, the field shredder 11 of the present invention is preferably detachably mounted on the forward end of a transport vehicle 12. The transport vehicle 12 may be either a conventional or a specially designed tractor. If it is a conventional tractor, the shredder may be independently powered, or it may be powered by hydraulic or electrical sources on the tractor. If vehicle 12 is specially designed, as disclosed herein, the shredder 11 is powered by the same engine which drives the transport vehicle 12.

The shredder 11 includes a mobile shredder frame 13 upon which the major components of the present invention are mounted. The front end of frame 13 is provided with an upper feeder roller 14 and a lower feeder roller 16. Both feeder rollers are elongated in configuration, having parallel axes of rotation. The axes of the feeder rollers are oriented transversely, however, with respect to the forward direction of travel of the shredder frame and the transport vehicle.

The feeder rollers are particularly well adapted to pick up individual branches 17 of variable size, from a row or pile 18 of pruned branches or other cuttings. The row of branches was previously formed when crews of workers passed through an orchard of trees 19, and so placed the cuttings during the pruning process. Other than arranging the cut branches in a row between the trees so that they can be accessed by the shredder 11, no other manipulation or handling of the branches is necessary for them to be processed by the shredder 11.

To effect efficient pick-up and feed of the branches 17 into the shredder 11, the outer periphery of upper feeder roller 14 is provided with a plurality of circumferentially-spaced gripping plates 21. The plates 21 extend longitudinally along the full length of the roller 14, projecting outwardly in perpendicular fashion. The plates 21 have an outer edge with teeth 22, or serrations, adapted for engaging the outer surface of the branches 17.

A drive shaft 23 extends from both ends of upper feeder roller 14. One end of the drive shaft 23 passes through a first rotatable end of a respective L-shaped sub-frame 24, for connection to a hydraulic motor 26. The other end of the drive shaft 23 passes through a bearing located in the first rotatable end of a sub-frame 24 on the other side of the shredder 11. Each sub-frame 24 is pivotally mounted by means of a bolt 27 to the shredder frame 13. A hydraulic damper 28 extends between each of the second rotatable ends of sub-frames 24 and the shredder frame 13.

Similarly, a drive shaft 29 extends from both ends of the lower feeder roller 16. One end of the drive shaft 29 passes through a respective support plate 31, for connection to a hydraulic motor 32. The other end of the drive shaft passes through a bearing located in a respective support plate 31 on the other side of the shredder 11. Both hydraulic motors 26 and 32 are preferably powered by a hydraulic pump and associated control valves (not shown), located on transport vehicle 12.

Lower feeder roller 16 includes a plurality of radially extending tines 33 for initially engaging and lifting the branches 17 from the ground. Although not critical, it should be noted that adjacent rows of tines are arranged in alternating offset relation along roller 16. Thus, rows 1 and 3 are in vertical alignment, but they are horizontally offset with respect to rows 2 and 4. It has been determined that this arrangement provides a suitable compromise between the need to have a sufficient number of tines to engage the stack of branches, without having so many tines that pickup efficiency is impaired.

Figure 8:
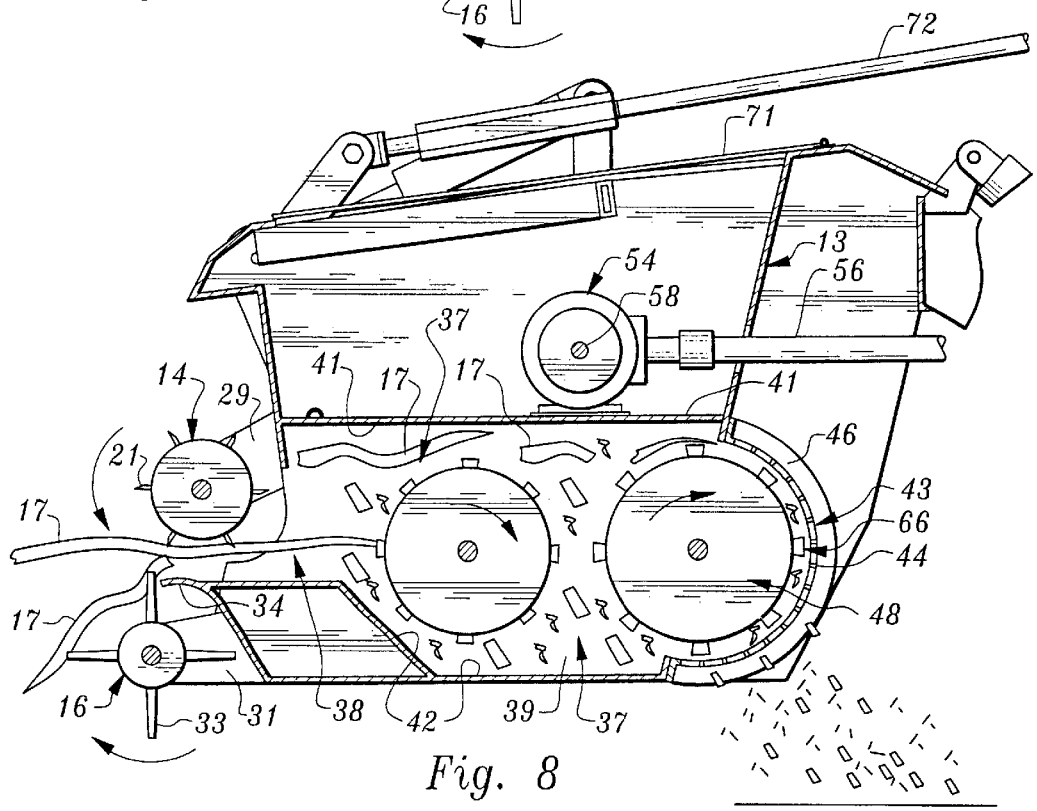
FIG. 8 is a transverse, cross-sectional view of the shredder, showing the upper and lower feeder rollers, and the first and second shredder rollers within the shredding chamber.

An elongated guide plate 34, provided with a plurality of slots 36 to accommodate rotational passage of the tines 33, is located above and slightly rearwardly from the lower feed roller 16. As will be noted particularly from a review of FIGS. 7 and 8, the feeder rollers 14 and 16 are counter-rotating. The tines 33 of the lower feeder roller engage the lower portion of the row or pile of branches. Owing to their upward rotation when encountering branches, the tines are effective to lift the branches upwardly and rearwardly. Concurrently, the gripping plates 21 engage the upper portion of the row of branches, and drive the branches downwardly and rearwardly. The guide plate 34 is located at the confluence of these forces at the material input of the feeder rollers, ensuring that the branches are maintained in substantially horizontal relation, as they are picked up and actively driven into the shredder 11.

The pruned branches 17 vary in diameter from finger size to approximately 4". Therefore, the shredder feeding mechanism must be able to accommodate these varying sizes, efficiently and without sustaining damage. If the gap between the feeder rollers were maintained at a distance corresponding to the maximum diameter of the branches, no damage would occur from large incoming branches. However, pickup efficiency would suffer for small branches, owing to the greater than optimum distance between operative elements of the feeder rollers and the small branches. If the gap-between the feeder rollers were set at a distance corresponding to the minimum diameter of the branches, the pickup efficiency would be very good for small branches. Unfortunately, upon encountering a large incoming branch, the tines and the gripping plates of the feeder rollers might be damages.

Figures 6, 7:
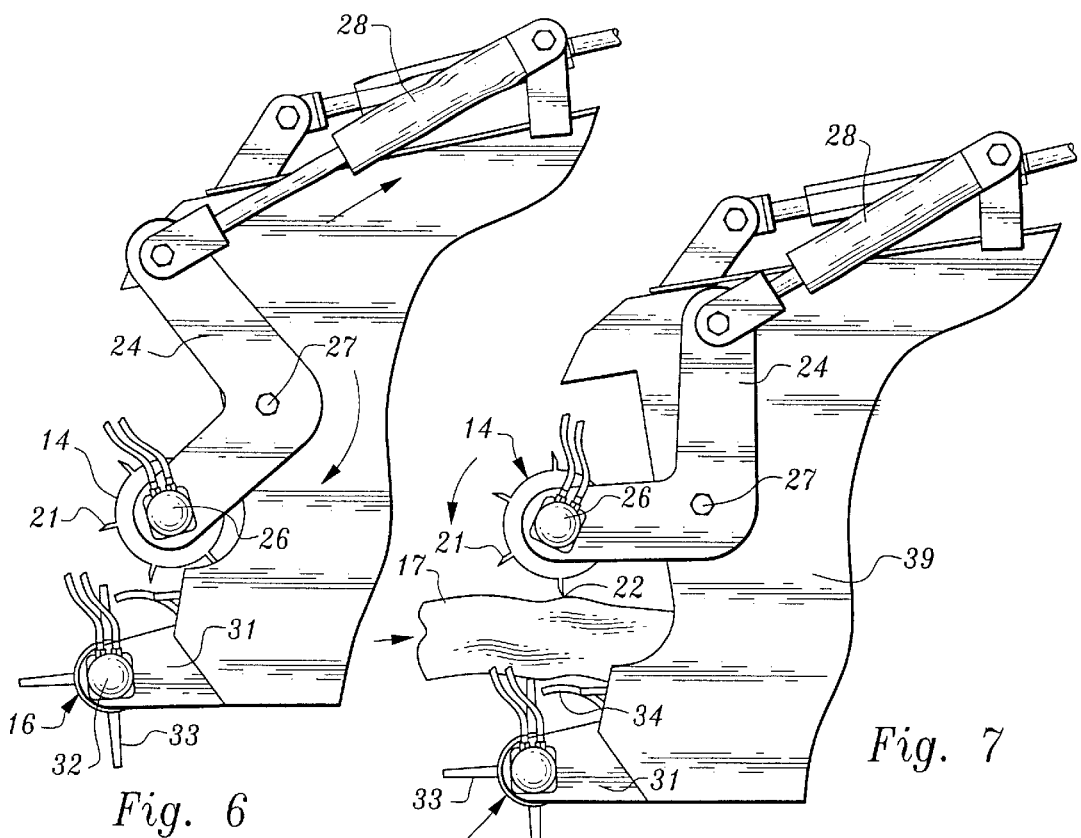
FIG. 6 is a fragmentary, side elevational view of the right-hand, front-end portion of the shredder, showing the upper feeder roller in a lowermost position.
FIG. 7 is a view as in FIG. 6, but showing the upper feeder roller in a raised position, in response to forces provided by a large, incoming branch.

The operation of a mechanism previously described, handles these varying branch sizes without serious compromise. By securing the upper feeder roller 14 to a pivotally mounted sub-frame assembly, variable thicknesses for branches are easily accommodated. For example, in FIG. 8, relatively small incoming branches 17 are effectively drawn into the shredder, as the sub-frame and attached upper feeder roller, have dropped to a lower position. With the gap distance between the rollers reduced, effective contact between the tines, the gripping plates, and the branches is maintained. In FIG. 7, a relatively large branch 17 is being drawn into the shredder, causing sub-frame 24 to pivot upwardly, effectively increasing the gap distance between the rollers. No damage to the rollers or their operative elements occurs. As this pivoting action, both upwardly and downwardly can be abrupt, hydraulic damper 28 is provided to smooth out the rate of rotational movement of the sub-frame, in both directions.

Having described the branch feeding mechanism, we can now turn attention to the material shredding components of the shredder 11. A shredding chamber, generally designated by the numeral 37, is within and mounted to the central and rear portions of the shredder frame 13. Shredding chamber 37 has a front inlet 38, adjacent the material output of the feeder rollers, for receipt of branches 17 (See, FIG. 8). Chamber 37 has a volume which is generally defined by lateral end plates 39, an upper chamber shroud 41, and a lower chamber shroud 42. Shrouds 41 and 42 span end plates 39, and provide upper and lower walls for the chamber. It should be noted that in FIG. 2, two detachable cover plates of the shroud 41 have been removed so that the inner details within chamber 37 can be seen. These cover plates are provided for inspection and maintenance of the internal components of the shredder chamber. However, in normal operation of the shredder, these cover plates are secured in place so that shroud 41 provides a continuous upper wall for the chamber 37.

The shredding chamber 37 also includes an acuate, rear-positioned chamber screen 43, most clearly shown in FIG. 9. Chamber screen 43 is semi-circular in cross-section, and includes a plurality of perforations 44 along its length. These perforations, which may range from a size of ½" to 1½", provide an outlet for the shredded branch particles. Arcuate reinforcement ribs 46 are provided around the outer periphery of screen 43. Without ribs 46, the screen 43 would distort or fail, owing to the tremendous forces imposed on the screen during the shredding operation.

Figure 3:
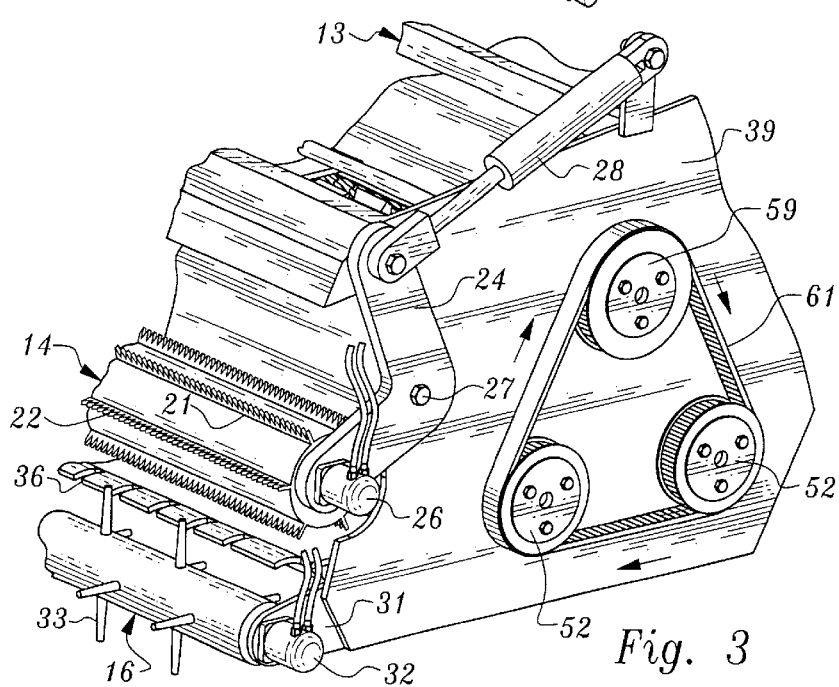
FIG. 3 is a fragmentary, perspective view of the right-hand end of the shredder, as viewed in FIG. 2, the end shroud being removed to show the drive pulley and the shredder roller pulleys.

Housed within the shredding chamber 37 are a first shredder roller 47 and a second shredder roller 48. Shredder rollers 47 and 48 have longitudinal axes of rotation which are generally parallel to the axes of rotation of the upper and lower feeder rollers 14 and 16. First shredder roller 47 is mounted for rotation on a roller drive shaft 49, passing through both end plates 39 of the shredding chamber. Similarly, second shredder roller 48 is mounted for rotation on a roller drive shaft 51, which also passes through end plates 39. Shredder roller pulleys 52 are provided on both ends of shafts 49 and 51. Pulley cover 53 has been removed in FIGS. 3, 4, and 5 to show these pulleys. In normal operation of the shredder 11, as shown in FIG. 1, pulley cover 53 encloses these pulleys and their related components.

Figure 2:
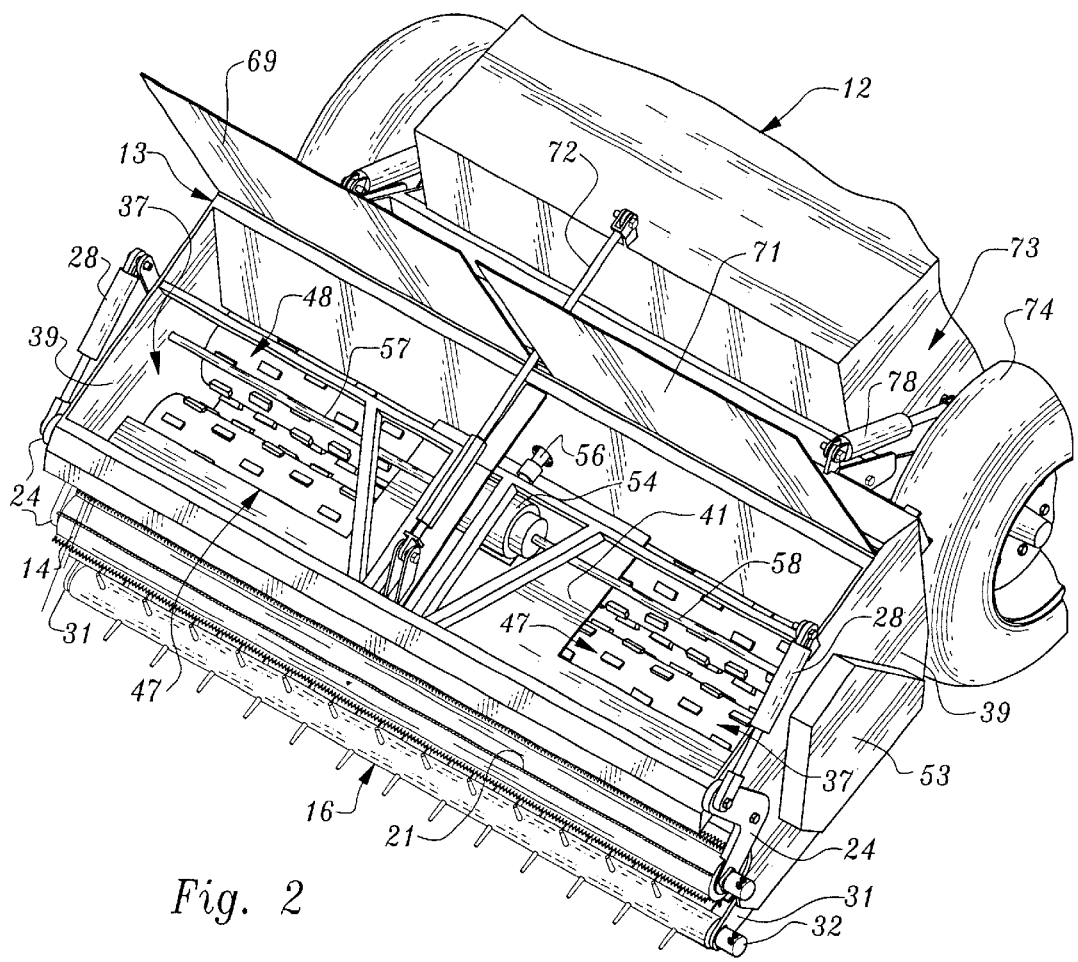
FIG. 2 is a perspective view of the field shredder taken from an elevated angle, the outer housing covers being raised and two cover plates of the upper chamber shroud being removed to show the pair of shredder rollers within the shredding chamber.

A gear box 54 is mounted in the central, upper portion of the shredder frame 13 (See, FIG. 2). The gear box 54 has an input drive shaft 56, and output drive shafts 57 and 58. Rotational driving forces are provided to the input drive shaft 56 by an engine (not shown). This engine may be mounted either on the shredder frame 13, or within the transport vehicle 12. The output drive shafts 57 and 58 extend laterally from either side of the gear box 54, through and past both end plates 39 of the shredding chamber. A drive pulley 59 is located on the outer end extremity of each output drive shaft. A toothed drive belt 61 interconnects the drive pulley 59 with the roller pulleys 52 for the shredder rollers. The shredder rollers 47 and 48 are thereby driven in tandem, at both ends, in such a manner that their upper portions rotate rearwardly, and their lower portions rotate forwardly (See, FIG. 8).

The first shredder roller 47 is provided with a plurality of knife blocks 62, strategically located rows which are longitudinally offset to define semi-helical paths on the outer periphery of the roller 47. By semi-helical, it is meant that consecutive knife blocks in only three or four rows of the knife blocks are longitudinally offset to define a helical path. Then, the next consecutive knife block in the first row defines the beginning of another semi-helical path. Offsetting the knives in this fashion distributes the cutting forces more evenly around the shredder rollers.

Knife blocks 62 include a first knife edge 63 and a second knife edge 64. Blocks 62 are preferably welded to the outer periphery of roller 47 for strength. After the shredder has been operated for some time, the knife blocks are examined. If the first knife edges of the blocks 62 are determined to be dull, the entire roller 47 may be removed from the shredding chamber, and reversed, end-for-end. When this is done, the second knife edge 64 is now primarily exposed to the incoming material, and efficient operation of the shredder will resume.

The second shredder roller 48 is similarly equipped with a plurality of knife blocks 66, each having a first knife edge 67 and a second knife edge 68. However, the height of knife blocks 66 is preferably somewhat greater than the height of the knife blocks 62, located on the first shredder roller 47. This preference stems from the determination that if the cutting and shredding action of first shredding roller is too aggressive, it will load and stress the shredder. By stepping the height of the knife blocks 62 and 68, the material is successively and more smoothly, cut and shredded into smaller pieces.

The sharp leading edge of each of the knife blocks is arranged in spaced relation from the upper shroud 41, the lower shroud 42, and the arcuate chamber screen 43. These knife blocks both cut and shred the incoming branches, as they pass through the shredding chamber, first rearwardly from the first roller to the second roller, and then forwardly from the second roller to the first roller. Any piece of material which is too large to be forced through the perforations in the screen 43 will be carried around the shredder rollers through the bottom portion of the shredding chamber, and passed through the cutting and shredding process again.

The residence time of material within the shredding chamber determines the size and consistency of the outputted particles. If the perforations within the chamber screen are enlarged in size, the residence time will be reduced and the particle size increased. If the perforations within the chamber screen are reduced in size, the residence time will be increased and the particle size decreased.

The shredder 11 includes outer housing covers 69 and 71, as best viewed in FIG. 2. Covers 69 and 71 are hingeably affixed along one edge to shredder frame 13. During normal operation of the shredder, covers 69 and 71 are closed to keep debris and dirt off of the upper shroud 41 and the gear box 54. The shredder also includes a brace rod 72, extending from the forward end of the transport vehicle 12 to the forward end of the shredder frame 13. Because the shredder is suspended off the forward end of the vehicle 12, considerable downward forces are developed. Brace rod 72 is effective to counteract these forces, much in the same fashion as a suspension rod does, extending from the rear of a tractor to a three-point tractor attachment.

Figure 4:
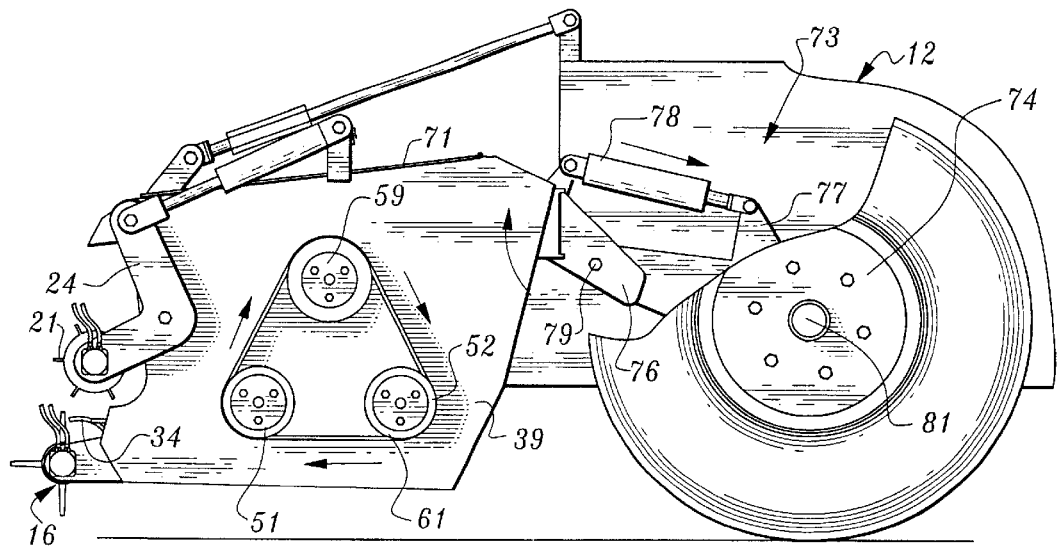
FIG. 4 is a side elevational view of the right-hand end of the shredder in a lowered, operational position.

When the shredder 11 is used in the field, it is normally in a lowered position, so it can effectively pickup branches from the ground (See, FIG. 4). However, when the end of a row is reached, or when the shredder is being moved from orchard to orchard, it is desirable to raise the shredder to an elevated position, to lessen the chance of damage to the lower feeder roller 16 or the tines 33. For that purpose, the transport vehicle disclosed herein employs an adjustable height suspension assembly 73, for the front wheels 74 of the transport vehicle.

Figure 5:
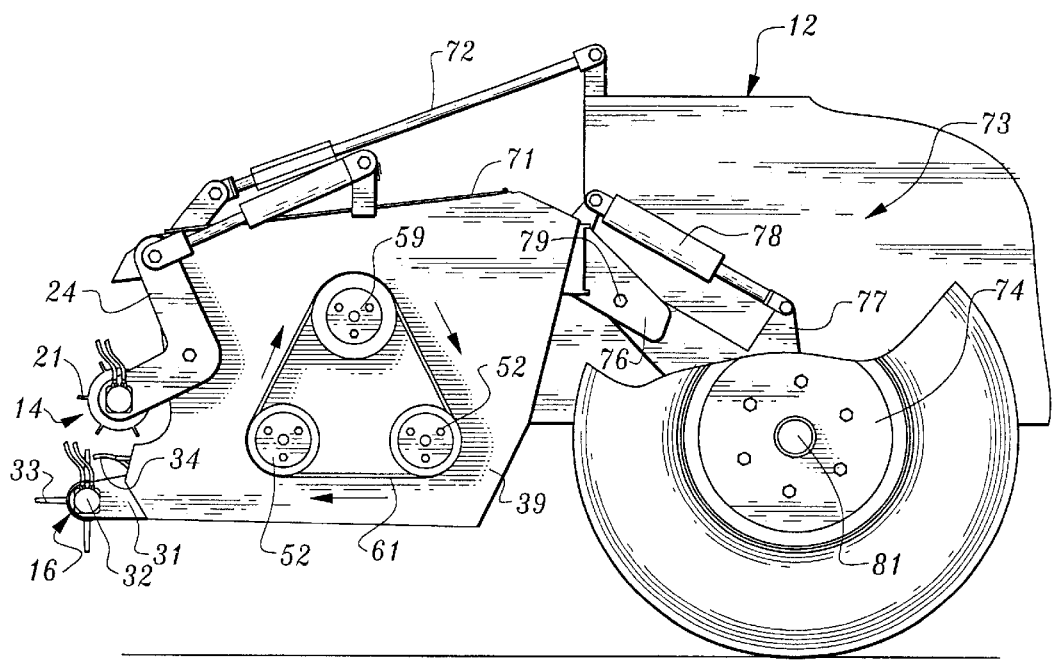
FIG. 5 is a view as in FIG. 4, but with the shredder in a raised, disabled position, for maneuvering and transport.

Suspension assembly 73 includes a bracket 76, and axle plate 77, and a hydraulic ram 78. Bracket 76 extends from the shredder frame 13 and includes a pivot bolt 79 at its lower end. Axle plate 77 is pivotally attached to bracket 76 through the pivot bolt 79. Axle plate 79 supports wheel 74 about an axle 81. Hydraulic ram 78 extends between an upper portion of bracket 76 and axle plate 77. When hydraulic ram 78 is retracted, the front end of vehicle 12 and the shredder 11 are in a lowered position, as shown in FIG. 4. When hydraulic ram 78 is extended, plate 77 pivots about bolt 79, in effect raising the front end of the vehicle and the shredder, as shown in FIG. 5. In this manner the shredder 11 can be lowered and raised as necessary so that both shredding and offsite transport can be accommodated.

It will be appreciated that I have disclosed a mobile field shredder having the capability to lift branches, arranged in piles and rows on the ground of an orchard, and continuously shred the branches into particles of a size and constituency that they will readily decompose and enrich the orchard soil.

What is claimed is:

1. An apparatus for shredding pruned material lying on the ground, comprising:
    a. a mobile shredder frame;
    b. feeder means for picking up the pruned material from the ground, said feeder means being located on a front end of said shredder frame and having a material input and a material output, said feeder means comprising a pair of elongated, counter-rotating feeder rollers, said feeder rollers including an upper feeder roller and a lower feeder roller, said upper feeder roller including a plurality of circumferentially spaced gripping plates extending longitudinally along its outer periphery, said gripping plates including an outer toothed portion for engaging the branches;
    c. a shredding chamber mounted on said shredder frame, said chamber having an inlet adjacent said material output and a shredded particle discharge;
    d. shredder means within said shredding chamber; and,
    e. means for continuously moving said shredder frame along a path over the ground.

2. An apparatus as in claim 1 in which said lower feeder roller includes a plurality of radially extending tines.

3. An apparatus for shredding pruned material lying on the ground, comprising:

a. a mobile shredder frame;
b. feeder means for picking up the pruned material from the ground, said feeder means being located on a front end of said shredder frame and having a material input and a material output;
c. a shredding chamber mounted on said shredder frame, said chamber having an inlet adjacent said material output and a shredded particle discharge;
d. shredder means within said shredding chamber, said shredder means including a first shredder roller and a second shredder roller, said first shredder roller having a first plurality of knife blocks on its outer periphery and said second shredder roller having a second plurality of knife blocks on its outer periphery; and,
e. means for continuously moving said shredder frame along a path over the ground.

4. An apparatus as in claim 3 in which said first and second shredder rollers have parallel axes in horizontal relation, said axes being transverse to the path of travel for said frame, and further including means to rotate said rollers in the same direction.

5. An apparatus as in claim 4 in which said shredder rollers have respective upper portions rotating away from said feeder means, and respective lower portions rotating toward said feeder means.

6. An apparatus as in claim 3 in which said first shredder roller is adjacent said output of said feeder means, and in which said first plurality of knife blocks is shorter than said second plurality of knife blocks.

7. An apparatus as in claim 6 in which said knife first and second pluralities of knife blocks are arranged in rows and in which individual ones of knife blocks in adjacent rows are arranged in longitudinally offset relation.

8. An apparatus as in claim 1 or 3 in which said shredded particle discharge comprises a chamber screen, said chamber screen having a plurality of perforations therein for the passage of particles therethrough.

9. An apparatus as in claim 8 in which said perforations are sized to determine a residence time for shredded particles within said shredding chamber, so that particles passing through said perforations have a size and consistency suitable for decomposition in the ground.

10. An apparatus as in claim 8 in which said perforations are approximately sized from ½" to 1½" in diameter.

11. An apparatus as in claim 1 or 3 in which said means for continuously moving said shredder frame comprises a tractor, and in which said shredder frame is attached to a front end of said tractor.

12. An apparatus as in claim 11 in which said tractor includes front wheels which are movable from a raised position, in which said shredder frame maintained in an inoperable position, to a lowered position, in which said shredder frame is maintained in an operating position.

13. Apparatus as in claim 11 in which said shredder frame is detachable from said tractor, and further including power coupling means between said tractor and said shredder frame, providing rotary power from said tractor to said shredder means.

14. An apparatus for shredding pruned material lying on the ground, comprising:
a. a mobile shredder frame;
b. an upper feeder roller and a lower feeder roller mounted on a front end of said shredder frame, said feeder rollers counter-rotating toward each other at a material input and away from each other at a material output, said feeder rollers having respective outer peripheries and means on said outer peripheries for picking up and engaging the pruned material;
c. a shredding chamber mounted on said shredder frame, said chamber having an inlet adjacent said material output and a shredded particle discharge;
d. a first shredder roller and a second shredder roller located within said shredding chamber, said first shredder roller having a first plurality of knife blocks on its outer periphery and said second shredder roller having a second plurality of knife blocks on its outer periphery; and,
e. means for continuously moving said shredder frame along a path over the ground.

15. An apparatus as in claim 14 in which said means for picking up and engaging the pruned material comprises a plurality of circumferentially spaced gripping plates extending longitudinally along said outer periphery of said upper feeder roller, said gripping plates including an outer toothed portion, and in which said means further comprises a plurality of radially extending tines on said outer periphery of said lower feeder roller.

16. An apparatus as in claim 14 which said shredded particle discharge comprises a chamber screen, said chamber screen having a plurality of perforations therein for the passage of particles therethrough.

17. An apparatus as in claim 16 in which said perforations are sized to determine a residence time for shredded particles within said shredding chamber, so that particles passing through said perforations have a size and consistency suitable for decomposition in the ground.

18. An apparatus as in claim 16 in which said perforations are approximately sized from ½" to 1½" in diameter.

19. An apparatus as in claim 14 in which said first and second shredder rollers have parallel axes in horizontal relation, said axes being transverse to the path of travel for said frame, and further including means to rotate said rollers in the same direction.

20. An apparatus as in claim 14 in which said shredder rollers have respective upper portions rotating away from said feeder rollers, and respective lower portions rotating toward said feeder rollers.

21. An apparatus as in claim 14 in which said first shredder roller is adjacent said material output of said feeder rollers, and in which said first plurality of knife blocks is shorter than said second plurality of knife blocks.

22. An apparatus as in claim 14 in which said first and second pluralities of knife blocks are arranged in rows, and in which individual ones of said first and second pluralities of said knife blocks in adjacent rows are arranged in longitudinally offset relation.

23. An apparatus as in claim 14 in which said means for continuously moving said shredder frame comprises a tractor, and in which said shredder frame is attached to a front end of said tractor.

24. An apparatus as in claim 23 which said tractor includes front wheels which are movable from a raised position, in which said shredder frame is maintained in an inoperable position, to a lowered position, in which said shredder frame is lowered into an operating position.

25. An apparatus as in claim 23 in which said shredder frame is detachable from said tractor, and further including power coupling means between said tractor and said shredder frame, providing rotary power from said tractor to said first and second shredder rollers.

26. An apparatus for shredding pruned material lying on the ground, comprising:
a. a mobile shredder frame;

b. an upper feeder roller and a lower feeder roller mounted on a front end of said shredder frame, said feeder rollers being driven by respective hydraulic motors so that said rollers are counter-rotating toward each other at a material input and away from each other at a material output, said feeder rollers having respective outer peripheries and means on said outer peripheries for picking up and engaging the pruned material;

c. a shredding chamber mounted on said shredder frame, said chamber having an inlet adjacent said material output and a shredded particle discharge;

d. a first shredder roller and a second shredder roller located within said shredding chamber, said first shredder roller having a first plurality of knife blocks on a respective outer periphery and said second shredder roller having a second plurality of knife blocks on a respective outer periphery; and, e. a tractor having a front end, said shredder frame being attached to said front end of said tractor, said tractor further including an engine and a hydraulic pump, said engine having a rotary drive shaft coupled to said first and second shredder rollers, and said hydraulic pump being in fluid communication with said respective hydraulic motors.

27. An apparatus as in claim 26 in which said tractor includes front wheels which are movable from a raised position, in which said shredder frame is maintained in an inoperable position, to a lowered position, in which said shredder frame is maintained in an operating position.

28. An apparatus as in claim 26 in which said shredder frame is detachably coupled to said tractor.

* * * * *